A. JAS.
Condenser for Ice-Machines.

No. 161,237. Patented March 23, 1875.

Witnesses:

Inventor:
Auguste Jas
by Pollok & Bailey
attys

THE GRAPHIC CO.PHOTO-LITH.39 & 41 PARK PLACE,N.Y.

UNITED STATES PATENT OFFICE.

AUGUSTE JAS, OF NEW ORLEANS, LOUISIANA, ASSIGNOR OF ONE-HALF HIS RIGHT TO ALBERT C. JANIN, OF SAME PLACE.

IMPROVEMENT IN CONDENSERS FOR ICE-MACHINES.

Specification forming part of Letters Patent No. 161,237, dated March 23, 1875; application filed March 12, 1875.

*To all whom it may concern:*

Be it known that I, AUGUSTE JAS, of the Republic of France, and at present residing in the city of New Orleans, State of Louisiana, have invented a new and valuable improvement in condensers or liquefactors for use in machines for manufacturing ice and refrigerating air, liquids, &c.; and I do hereby declare that the following is a full, clear, and exact description of the construction and operation of the same, reference being had to the accompanying drawings, making part of this specification, and to the letters and figures of reference marked thereon.

My invention has reference to apparatus or machinery for making ice, or for refrigerating liquids, &c., by the action of ammonia, ether, or other volatile bodies which liquefy at a very low degree of temperature; and it particularly relates to that portion of such apparatus or machinery known as the condenser or liquefactor, by which the vaporized ether or other volatile body is brought back to liquid form.

The general construction and operation of apparatus of this kind is well known, and will be found, for instance, in Mühl's United States Letters Patent Nos. 121,402 and 121,888. I shall, therefore, confine my specification to that portion of the machinery or apparatus—viz., the condenser or liquefactor—in which my invention is comprised.

The object I have principally in view is to multiply to as great an extent as possible within a given space the points of contact of the volatile body to be liquefied with the refrigerating-surfaces. This I effect in a way that not only admits of a reduction in the size of the condenser over that of others heretofore used, but also results in a saving in the cost of manufacture, diminution in the quantity of water necessary to obtain liquefaction, and a more speedy condensation of the vapors.

The results above named are due in great measure to the employment of condensing-tubes, whether cylindrical or conical, containing each an Archimedean screw, that constitutes a spiral passage, through which the vapors are caused to pass.

The condensing-tubes are surrounded with cold water, constantly renewed, and they communicate at one end with a vapor-receiving chamber, from which the vapor passes into them, and at the other end with a receptacle, into which the liquefied vapor or gas flows from them.

One form of condenser or liquefactor in which my invention is embodied is represented in the accompanying drawing, in which—

Figure 1:
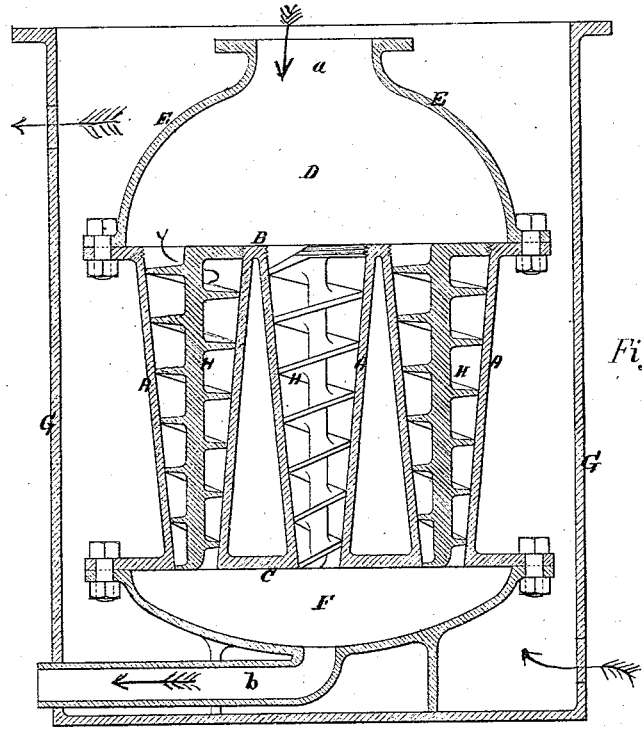
Figure 2:
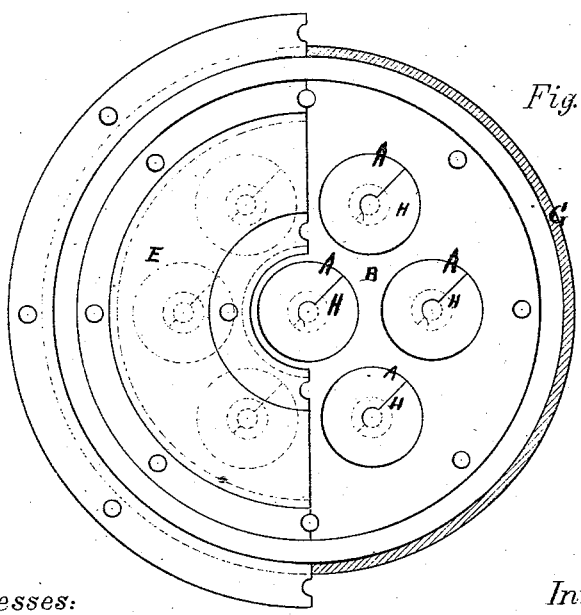

Figure 1 is a vertical central section of said condenser. Fig. 2 is a plan with a portion of the dome of the receiving-chamber removed.

The condensing-tubes are represented at A. They are made preferably in conical form, as shown, both for the more speedy and effective liquefaction of the vapor, and for ease and economy of manufacture. For the latter purpose they are also preferably cast in one piece with top and bottom plates B C. The larger ends of the tubes open into a chamber, D, the bottom of which is formed by the plate B. The upper part of the chamber is formed by the ellipsoidal-shaped cap E, with the top of which, at $a$, communicates the tube that conducts the vapors to the condenser. The cap is bolted or riveted to the plate B, as shown, so as to make a tight joint with it. The number of condensing-tubes may vary, depending somewhat upon the volatility of the vapor or gas to be condensed, and the quality of water available for use. Within each tube is an Archimedean screw, H, which fits exactly the interior bore of the tube, with its periphery accurately in contact with the interior surface of the tube, making therewith a tight joint, so that the vapor or gas to arrive at the lower end of the tube must follow the spiral passage formed by the screw. This arrangement in effect multiplies to a very great degree the refrigerating-surfaces with which the gas must have contact, and is most effective to reduce the vapor or gas to liquid form, which reduction or condensation is also facilitated or furthered by the gradually-decreasing diameter of the condensing-tube. By multiplying the number of tubes thus provided with internal spiral passages, I am enabled, with a small volume of cold water, to produce a refrigerating action much more considerable than produced in other apparatus of the kind heretofore used. The conical form of the tubes is preferable on many accounts. It enables me with great ease to cast them in one piece with the top and bottom plates B C; also to readily polish and finish their interiors to receive the screws, which are simply dropped into the tubes, and are there held tightly by means of a screw-thread on the periphery of each screw at the upper end engaging a like screw-thread on the interior of the tube. A turn or two of the Archimedean screw in its tube will have the effect of drawing it tightly and securely to its seat. The lower and contracted ends of the condensing-tubes open through the bottom plate C into a receptacle, F, (similar to chamber D,) into which falls the liquefied vapor or gas which has been condensed in the tubes. From receptacle F leads the pipe b, which conducts the liquid to the refrigerating or cooling portion of the apparatus. The condenser is surrounded by a tank, G, to which water is supplied in the usual way. The tank is, of course, provided with a supply-pipe at or near its bottom, and an overflow-pipe at or near its top. The tank, if desired, may be closed, and provided with an escape or overflow, regulated at pleasure to have a greater or less size, so that the water in the tank may be under pressure, if required. The axes or central shafts of the Archimedean screws may be hollow, and arranged to communicate with the water-space.

By thus forming them the condensing capacity of the apparatus will be sensibly increased.

The condenser or liquefactor thus organized is, as above stated, designed more particularly for use in refrigerating apparatus; but it is manifest that it can also be used in other connections—as, for instance, in distilling apparatus, &c.

Having now described my invention, and the manner in which the same is or may be carried into effect, what I claim, and desire to secure by Letters Patent, is—

1. The combination, in the condenser or liquefactor, of the vapor-receiving chamber, the liquid-receptacle, the intermediate connecting-tubes, and the Archimedean screws within said tubes, substantially as shown and set forth.

2. The intermediate connecting-tubes, of conical form, provided with internal spiral passages, communicating at their larger ends with the vapor-receiving chamber, and at their smaller ends with the receptacle for the condensed vapor or gas, substantially as set forth.

In testimony that I claim the above I have hereunto subscribed my name in the presence of two witnesses.

A. JAS.

Witnesses:
 A. M. HEBERT,
 Dr. T. G. HAVA.